US012540667B2

(12) United States Patent
Chan Chuen

(10) Patent No.: US 12,540,667 B2
(45) Date of Patent: Feb. 3, 2026

(54) COMBINED ROTATING COMPONENT AND FLUID PORT BAFFLE

(71) Applicant: PRATT & WHITNEY CANADA CORP., Longueuil (CA)

(72) Inventor: Cedric Chan Chuen, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/732,862

(22) Filed: Jun. 4, 2024

(65) Prior Publication Data
US 2025/0369509 A1 Dec. 4, 2025

(51) Int. Cl.
F16H 57/04 (2010.01)

(52) U.S. Cl.
CPC ............... F16H 57/0423 (2013.01)

(58) Field of Classification Search
CPC ........ F16H 57/0423; F01M 2011/005
See application file for complete search history.

(56) References Cited

U.S. PATENT DOCUMENTS

| 3,788,426 | A | 1/1974 | Hull, Jr. | |
| 7,789,200 | B2 * | 9/2010 | Munson | F01D 25/20 184/6.12 |
| 8,167,091 | B2 | 5/2012 | Alecu et al. | |
| 8,499,893 | B2 * | 8/2013 | Alecu | F01D 25/18 184/6.11 |
| 8,777,792 | B2 | 7/2014 | Imai et al. | |
| 9,470,303 | B2 | 10/2016 | McPeak et al. | |
| 9,810,311 | B1 * | 11/2017 | Zhang | F16H 57/0483 |
| 10,197,150 | B2 | 2/2019 | Anglin et al. | |
| 11,073,043 | B2 | 7/2021 | Guillemont | |
| 11,162,421 | B2 * | 11/2021 | Dick | F16N 7/32 |
| 11,181,183 | B2 | 11/2021 | Carson | |
| 11,339,724 | B2 | 5/2022 | Di Giovanni et al. | |
| 11,365,798 | B1 * | 6/2022 | Rejman | F16H 57/02 |
| 11,892,006 | B2 | 2/2024 | Lu et al. | |

FOREIGN PATENT DOCUMENTS

| DE | 102016223747 A1 * | 5/2018 | ............... F16H 1/06 |
| FR | 3133654 B1 | 3/2024 | |
| GB | 2572162 B | 11/2022 | |
| WO | WO-2023003294 A1 * | 1/2023 | ............ F15B 21/008 |

* cited by examiner

Primary Examiner — Minh Truong
(74) Attorney, Agent, or Firm — NORTON ROSE FULBRIGHT CANADA LLP

(57) ABSTRACT

An aircraft engine has a gearbox having a casing defining an internal chamber and a scavenge port. A gear is rotatably mounted inside the internal chamber for rotation about a rotation axis. The gear is axially spaced from the scavenge port. A baffle is disposed inside the internal chamber. The baffle includes a perforated plate disposed radially between the gear and the scavenge port relative to the rotation axis. The perforated plate has a first portion extending around a portion of a circumference of the gear, and a second portion extending axially away from the first portion over the scavenge port of the scavenge area.

17 Claims, 3 Drawing Sheets

COMBINED ROTATING COMPONENT AND FLUID PORT BAFFLE

TECHNICAL FIELD

The application relates generally to fluid systems for aircraft engines and, more particularly, to baffles.

BACKGROUND OF THE ART

Aircraft engines typically include a gearbox containing a gear train drivingly connected to an engine shaft. The gearbox is connected to a lubrication system (e.g., an oil system) for lubricating and cooling the gear train within the gearbox. Gear train rotation generates a high velocity and unsteady flow of high density air/oil mixture inside the gearbox, which can blast oil off the collecting areas onto the rotating parts. Baffles may be used within the gearbox for the purpose of deflecting oil blasting away from the collecting areas. While known baffle configurations have various advantages, there is still room in the art for improvement.

SUMMARY

In one aspect, there is provided a gearbox of an aircraft engine, comprising: a casing defining an internal chamber having a scavenge area, the scavenge area having a scavenge port for scavenging lubricant from the internal chamber; a gear rotatably mounted inside the internal chamber for rotation about a rotation axis, the gear axially spaced from the scavenge port along the rotation axis; and a baffle inside the internal chamber, the baffle including a perforated plate disposed radially between the gear and the scavenge port relative to the rotation axis, the perforated plate having a first portion extending around a portion of a circumference of the gear, and a second portion extending axially away from the first portion over the scavenge port of the scavenge area.

In another aspect, there is provided a gearbox of an aircraft engine, comprising: a casing defining an internal chamber having a scavenge port; a gear disposed inside the internal chamber for rotation about a rotation axis, the gear axially spaced from the scavenge port along the rotation axis and disposed at a higher elevation than the scavenge port; and a baffle supported within the internal chamber at an elevation comprised between the gear and the scavenge port, the baffle having a perforated plate axially spanning both the gear and the scavenge port.

In a further aspect, there is provided an oil scavenge system of an aircraft engine, comprising: a casing defining an internal chamber about a rotation axis of a rotating component, the internal chamber confining oil in motion within the casing and defining a scavenge area below the rotation axis, the scavenge area having a scavenge port at a bottom of the casing; and a baffle disposed within the internal chamber and located in the scavenge area, the baffle having an inverted T-shaped cross-section comprising a perforated plate at a lower end of a web projecting from an intermediate location of the perforated plate towards the rotation axis, the web disposed axially between the rotation component and the scavenge port and axially facing an axially facing surface of the rotating component, the perforated plate axially spanning both the rotating component and the scavenge port.

DESCRIPTION OF THE DRAWINGS

Reference is now made to the accompanying figures in which.

DETAILED DESCRIPTION

Figure 1:
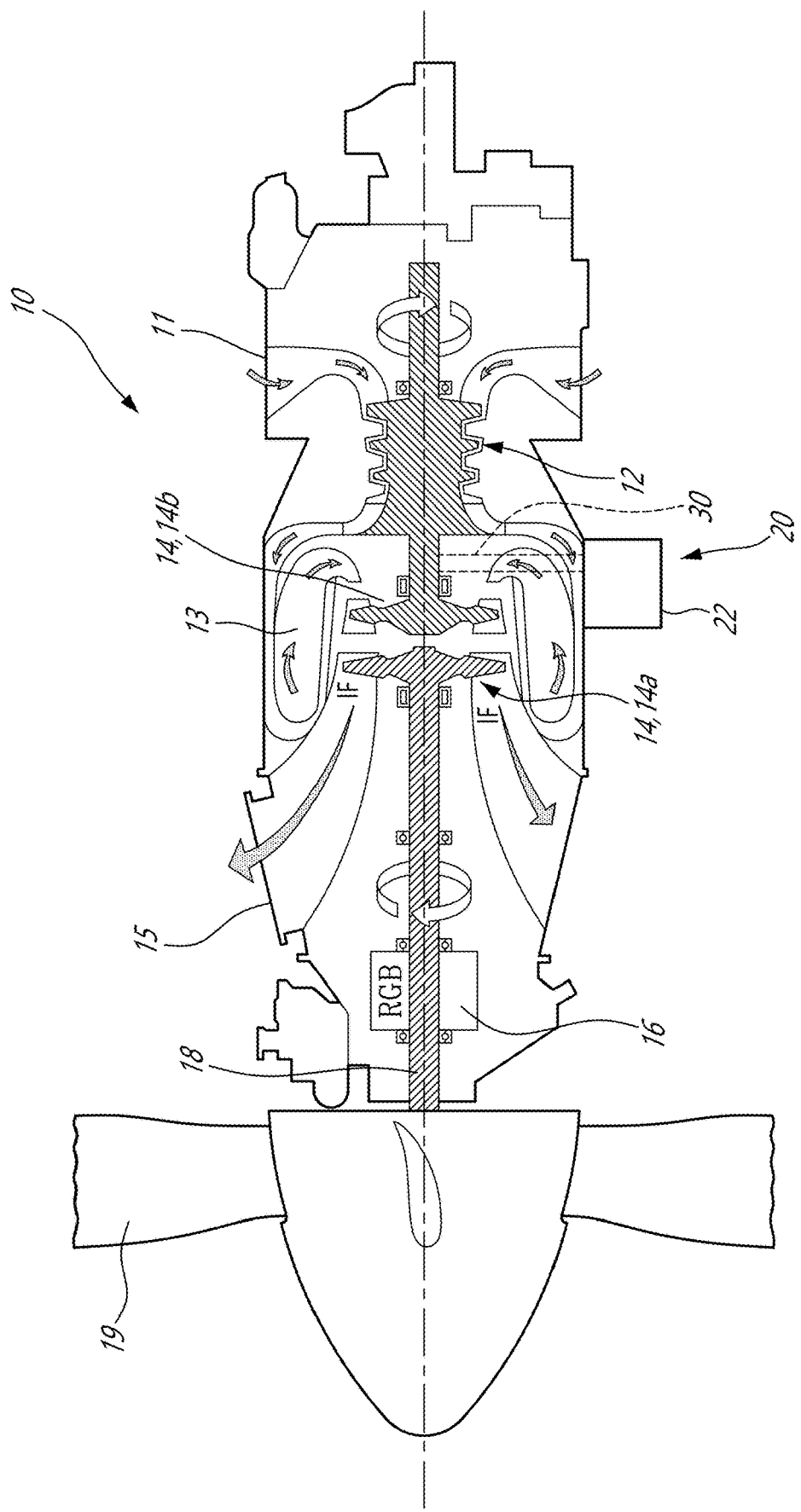
FIG. 1 is a schematic cross section view of a gas turbine engine.

FIG. 1 illustrates a turboprop engine as an example of an application of the present baffle system. However, it is understood that the principles of the present technology could be applied to other type of engines, such as turbofans, turboshafts and auxiliary power units (APUs). The exemplary engine 10 generally comprises in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust 15 through which the combustion gases exit the engine 10. The turbine section 14 includes a low pressure (LP) or power turbine 14a and a high pressure (HP) turbine 14b. The LP turbine 14a is drivingly connected to an input end of a reduction gearbox (RGB) 16. The RGB 16 has an output end drivingly connected to an output shaft 18 configured to drive a rotatable load 19 (e.g., a propeller in the depicted example).

Figure 2:
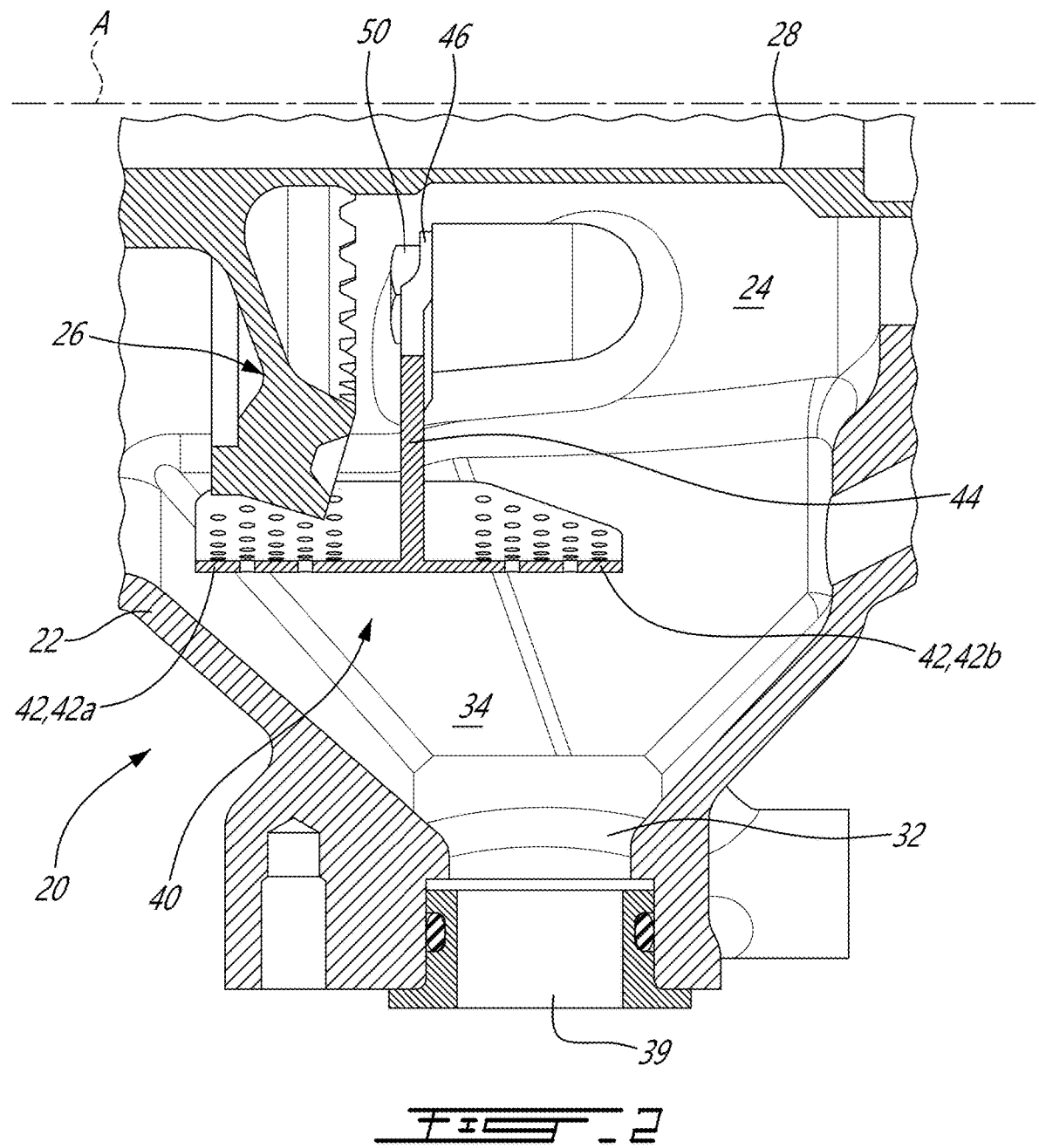
FIG. 2 is a cross-section view of a bottom portion of a gearbox of the engine shown in FIG. 1.

The engine 10 further includes an auxiliary or intermediate gearbox 20 which includes a casing 22 secured to the engine nacelle. As shown in FIG. 2, the casing 22 defines an internal chamber 24 in the formed of an enclosed space housing a gear train. The gear train includes a set of intermeshing gears, only one of which is shown at 26 in FIG. 2. The exemplary gear 26 is provided in the form of a bevel gear operably mounted to a gearbox shaft 28 for rotation therewith about a rotation axis A extending through the internal chamber 24 of the gearbox casing 22. The bevel gear 26 is intermeshed with an associated bevel gear (not shown) inside the internal chamber 24 of the gearbox casing 22 for receiving power from a driving source, such as tower shaft 30 (FIG. 1), which in turn is drivingly connected to the HP turbine 14b. The output of the gearbox 20 may be directly or indirectly drivingly connected to various auxiliary engine devices (not shown), such as a pump, a starter generator, etc., such that the driving power provided by the HP turbine 14b is distributed through the gear train of the gearbox 20 to said engine devices.

Lubricant (e.g., oil) is supplied to the rotating parts of the gearbox 20 from a reservoir (not shown) by a supply pump (not shown), which pumps lubricant to a plurality of nozzles (not shown) disposed inside the internal chamber 24 of the casing 22 of the gearbox 20. The nozzles are oriented and adapted to spray a supply of lubricant on the rotating gearbox parts, e.g., the gears and bearings, thereby both lubricating and cooling the rotating parts. Lubricant delivered to the rotating parts and after performing its intended function is drained through a scavenge port 32 defined in a bottom of a scavenge area 34 of the internal chamber 24 of the gearbox casing 22 below the rotation axis A and the bevel gear 26 shown in FIG. 2. According to one or more embodiments, the scavenge port 32 can be the single scavenge port of multiple lubricant cavities fluidly connected to the internal chamber 24 of the gearbox 20. As illustrated in FIG. 2, the scavenge area 34 may have a funnel shape converging downwardly to the scavenge port 32 at the bottom end of the funnel shaped scavenge area 34. Such a configuration may facilitate drainage of the lubricant from the internal chamber 24. The scavenge port 32 may be fluidly coupled to a scavenge pump (not shown) to scavenge oil from the internal chamber 24 through a conduit 39 operably connectable to the scavenge port 32.

In operation, the gear train rotation causes high velocity motion of the lubricant within the casing 22. This high velocity motion of the lubricant results in an unsteady flow of the lubricant within the internal chamber 24, which can blast liquid oil collected on the surfaces of stationary parts of the gearbox (referred to as the collecting areas) back onto the moving parts of the gear train. Such a lubricant flow dynamic may hinder proper drainage of the internal chamber 24 via the scavenge port 32. As consequence, the level of lubricant in the internal chamber 24 may raise above a desired level, which may potentially lead to lubricant churning. This occurs when the gears of the gearbox must churn through the lubricant as it performs its regular task. In such instances, the system works much harder to push through the excess lubricant inside the gearbox 20, which may result in higher operating temperatures, decreased efficiency and a reduction in the life of both the lubricant and the moving parts of the gearbox 20.

Figure 3:
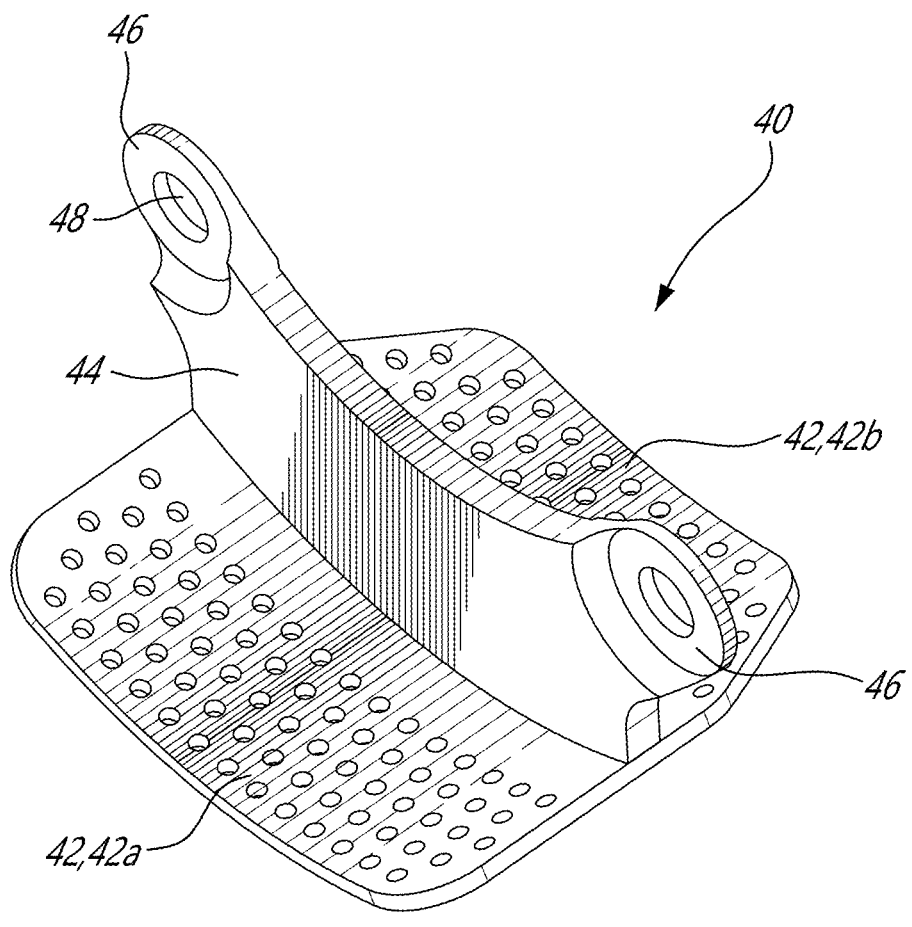
FIG. 3 is an isometric view of a one-piece baffle configured to be mounted in the bottom scavenge area of the gearbox to simultaneously shield a gear and a scavenge port of the gearbox.

Referring to FIGS. 2 and 3, it is herein proposed to dispose a stationary baffle 40 in the scavenge area 34 of the gearbox internal chamber 24 below the rotation axis A of the bevel gear 26 to mitigate the effects of the moving parts on the flow of lubricant and, thus, facilitate drainage of the internal chamber 24 of the gearbox casing 22 during operation. The baffle 40 generally comprises a perforated plate 42 and a solid/non-perforated web 44 projecting from a top surface (i.e., the surface facing away from the scavenge port 32) of the perforated plate 42 radially towards the rotation axis A of the gear 26. The perforated plate 42 has a first portion 42a projecting axially in a cantilevered fashion from a first axially facing side of the web 44 to a first axial location directly underneath the gear 26. The perforated plate 42 has a second portion 42b projecting in a cantilevered fashion from a second axially facing side of the web 44 opposite to the first side thereof to a second axial location overlying the scavenge port 32. Thus, the perforated plate 42 axially spans both the bevel gear 26 and the scavenge port 32 to form a combined gear and port baffle. Such a dual function baffle can be installed in limited spaces to shield two different components so as to help lubricant management inside a gearbox or the like. The perforated plate 42 and the web 44 of the baffle 40 are strategically disposed in the internal chamber 24 to interfere with the flow pattern of the lubricant inside the casing 22, dampening the flow fluctuations and deflecting the flow away from the collecting areas, thereby promoting better drainage.

As shown in FIG. 2, the web 44 is disposed axially between the bevel gear 26 and the scavenge port 32 in opposed facing relationship with an adjacent axially facing surface of the gear 26. The distal end of the web 44 opposite to the perforated plate 42 has two or more mounting points to the casing 22 at a radial location adjacent to the gearbox shaft 28 of the bevel gear 26. According to the embodiment illustrated in FIG. 3, the web 44 has two circumferentially spaced-apart mounting points. The mounting points may be provided in the form of ear-like tabs 46 each defining a hole 48 for receiving a fastener 50 (FIG. 2), such as a bolt. Accordingly, the baffle 40 can be suspended from the casing 22 via the web 44 into the upper end of the funnel-shaped scavenge area 34 with the first and second portions 42a, 42b of the perforated plate 42 cantilevered from the web 44. This eliminates the need for additional mounting points in the casing 22 underneath the perforated plate 42, while allowing for proper support of the baffle 40 in the gearbox 20. In this way, the exemplified funnel-shaped scavenge area 34 of the internal chamber 24 is not obstructed by any baffle support that could interfere with the flow of lubricant towards the scavenge port 32. The lubricant can flow through the perforated plate 42 and over the free peripheral edge thereof to the scavenge port 32, thereby ensuring proper drainage of the internal chamber 24 of the gearbox 20.

Still referring to FIGS. 2 and 3, it can be appreciated that the perforated plate 42 defines a curve around the rotation axis A. According to some embodiments, the center of curvature of the perforated plate 42 lies on the rotation axis of the bevel gear 26. That is the bevel gear 26 and the perforated plate 42 are concentrically disposed relative to one another. This allows to have a uniform gap between the perforated plate 42 and the gear 26 for lubricant to flow through. Circumferentially, the perforated plate 42 only extends along a bottom portion of the circumference of the bevel gear 26. That is the perforated plate 42 extends circumferentially along the portion of the circumference of the bevel gear 26 facing the scavenge port 32.

As shown in FIG. 3, the perforated plate 42 is located radially between the bevel gear 26 and the scavenge port 32 but at an elevation closer to the bevel gear 26 than to the scavenge port 32. However, according to the some embodiments, the first and second portions 42a, 42b of the perforated plate 42 (i.e., the gear portion and the port portion) could be disposed at different radial distances from the rotation axis A of the bevel gear 26 so as to allow the adjustment of the radial distance of the second portion 42b of the perforated plate 42 over the scavenge port 32. Accordingly, the first and second portions 42a, 42b of the perforated plate 42 may be coplanar or not.

As shown in FIG. 2, the baffle 40 may be said to have an inverted T-shaped cross-section, the web 44 forming the stem of the inverted T and the perforated plate 42 forming the arms extending laterally from the stem. However, it is understood that the baffle 40 could have other configurations depending on the geometry of the scavenge area 34 in which the baffle 40 is to be installed. According to some embodiments, the baffle 40 can be made of steel and manufactured as a separate part that can be detachably installed inside the gearbox 20. However, it is understood that the baffle 40 could be cast as an integral part of the gearbox casing 22.

Depending on the applications, the density of perforations in the second portion 42b of the perforated plate 42 can be the same or different from that in the first portion 42a of the plate 42. The size and shape of the perforations can also vary on the first and second portions 42a, 42b of the perforated plate 42 depending on the lubricant flow dynamics inside the internal chamber 24 of the gearbox 20.

In operation, the combined gear and scavenge port baffle 40 is stationary disposed at the upper end of the funnel-shaped scavenge area 34 so as to interfere with the flow pattern of the lubricant supplied into the internal chamber 24 of the gearbox, dampen the flow fluctuations and deflect the flow of lubricant towards the scavenge port 32. The top surface of the perforated plate 42 of the baffle forms a damping surface area to collect the lubricant and flow energy dissipation further occurs as the dampened lubricant passes through the holes of the perforated plate 42. This may also contribute to separate liquid lubricant from any air mixed therewith. The separated liquid collected on the plate 42 falls into and is collected around the scavenge port 32 from which the lubricant is then discharged back to the lubricant system of the engine. The resulting leaner air/lubricant mixture forms a relatively steady circulation with lower velocity and thus generates less heat and blasts less liquid lubricant from the collecting areas, thereby facilitating drainage from the internal chamber 24.

From the foregoing, it can be appreciated that at least some embodiments allows to manage lubricant flow in a confined space to facilitate drainage, while minimizing the number of baffle components, thereby reducing cost, weight, and complexity of assembly.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while present baffle system as been described in connection with the lubricant scavenge system of a gearbox, it is understood that the same principles could be applied to other apparatus having a moving part inside an oil cavity having an outlet port. Yet further modifications could be implemented by a person of ordinary skill in the art in view of the present disclosure, which modifications would be within the scope of the present technology.

The invention claimed is:

1. A gearbox of an aircraft engine, comprising:
a casing defining an internal chamber having a scavenge area, the scavenge area having a scavenge port for scavenging lubricant from the internal chamber;
a gear rotatably mounted inside the internal chamber for rotation about a rotation axis, the gear axially spaced from the scavenge port along the rotation axis; and
a baffle inside the internal chamber, the baffle including a perforated plate disposed radially between the gear and the scavenge port relative to the rotation axis, the perforated plate having a first portion extending around a portion of a circumference of the gear, and a second portion extending axially away from the first portion over the scavenge port of the scavenge area;
wherein the first portion and the second portion of the perforated plate extend in a cantilevered fashion from opposed sides of a web portion, the web portion having two or more mounting points to the casing, and wherein the web portion is disposed at an axial location between the gear and the scavenge port.

2. The gearbox of claim 1, wherein the first portion and the second portion of the perforated plate are located at a same radial distance from the rotation axis.

3. The gearbox of claim 1, wherein the perforated plate defines a curvature around the rotation axis, the curvature having a center of curvature lying on the rotation axis.

4. The gearbox of claim 1, wherein the web portion extends away from the perforated plate towards the rotation axis of the gear and in opposed facing relationship with an axially facing surface of the gear.

5. The gearbox of claim 1, wherein the scavenge area is shaped as a funnel with the scavenge port disposed at a bottom end of the funnel, and wherein the perforated plate of the baffle is disposed at an upper end of the funnel, and wherein the baffle is attached to the casing at a location outside of the funnel.

6. The gearbox of claim 1, wherein the perforated plate is suspended from the casing by the web portion.

7. The gearbox of claim 1, wherein the baffle has two or more mounting points to the casing, and wherein the two or more mounting points are circumferentially spaced-apart and located radially between the rotation axis and the perforated plate.

8. The gearbox of claim 1, wherein the baffle has an inverted T-shaped cross-section with a mounting point to the casing disposed axially between the first and second portions of the perforated plate and radially between the rotation axis of the gear and the perforated plate of the baffle.

9. A gearbox of an aircraft engine, comprising:
a casing defining an internal chamber having a scavenge port;
a gear disposed inside the internal chamber for rotation about a rotation axis, the gear axially spaced from the scavenge port along the rotation axis and disposed at a higher elevation than the scavenge port; and
a baffle supported within the internal chamber at an elevation comprised between the gear and the scavenge port, the baffle having a perforated plate axially spanning both the gear and the scavenge port:
wherein the perforated plate is supported via a web projecting from the perforated plate towards the rotation axis, the web disposed axially between the gear and the scavenge port.

10. The gearbox of claim 9, wherein the web is disposed in axially facing relationship with an axially facing surface of the gear.

11. The gearbox of claim 9, wherein the perforated plate has a first portion projecting axially from a first side of the web to a location underneath the gear, and a second portion projecting axially from a second side of the web opposite to the first side to a location extending over the scavenge port.

12. The gearbox of claim 11, wherein the perforated plate is free from any support on a side of the perforated plate facing the scavenge port.

13. The gearbox of claim 11, wherein the first portion and the second portion of the perforated pate defines a curve around the rotation axis of the gear.

14. An oil scavenge system of an aircraft engine, comprising:
a casing defining an internal chamber about a rotation axis of a rotating component, the internal chamber confining oil in motion within the casing and defining a scavenge area below the rotation axis, the scavenge area having a scavenge port at a bottom of the casing; and
a baffle disposed within the internal chamber and located in the scavenge area, the baffle having an inverted T-shaped cross-section comprising a perforated plate at a lower end of a web projecting from an intermediate location of the perforated plate towards the rotation axis, the web disposed axially between the rotation component and the scavenge port and axially facing an axially facing surface of the rotating component, the perforated plate axially spanning both the rotating component and the scavenge port.

15. The oil scavenge system of claim 14, wherein the perforated plate is disposed closer to the rotating component than the scavenge port.

16. The oil scavenge system of claim 14, wherein the web is attached to the casing at a radial location between the rotation axis and the perforated plate.

17. The oil scavenge system of claim 14, wherein the web is solid.

* * * * *